United States Patent
Nummila-Pakarinen et al.

(10) Patent No.: US 8,278,393 B2
(45) Date of Patent: Oct. 2, 2012

(54) POLYETHYLENE BLEND COMPONENT AND BLENDS CONTAINING THE SAME

(75) Inventors: Auli Nummila-Pakarinen, Roviovuorenkatu (FI); Oivind Moen, Sannidal (NO); Pertti Mikkola, Porvoo (FI); Janne Jamsen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 260 days.

(21) Appl. No.: 12/083,640

(22) PCT Filed: Sep. 14, 2006

(86) PCT No.: PCT/EP2006/008977
§ 371 (c)(1),
(2), (4) Date: Sep. 17, 2008

(87) PCT Pub. No.: WO2007/045315
PCT Pub. Date: Apr. 26, 2007

(65) Prior Publication Data
US 2009/0156749 A1    Jun. 18, 2009

(30) Foreign Application Priority Data
Oct. 18, 2005 (EP) .................................. 05022688

(51) Int. Cl.
*C08L 23/04* (2006.01)
*C08L 23/06* (2006.01)
*C08F 10/02* (2006.01)

(52) U.S. Cl. ........ 525/240; 525/191; 526/65; 526/352.2

(58) Field of Classification Search ................. 525/191, 525/240; 526/352.2, 65
See application file for complete search history.

(56) References Cited

U.S. PATENT DOCUMENTS

| | | | |
|---|---|---|---|
| 5,358,792 A | | 10/1994 | Mehta et al. |
| 5,582,923 A | * | 12/1996 | Kale et al. ..................... 428/523 |
| 5,965,674 A | * | 10/1999 | Moen et al. ..................... 526/61 |
| 6,509,106 B1 | | 1/2003 | Edwards et al. |

FOREIGN PATENT DOCUMENTS

| | | |
|---|---|---|
| EP | 0 479 277 | 4/1992 |
| EP | 0666283 A1 | 8/1995 |
| MX | PA01001472 A | 5/2002 |
| WO | WO 96/16119 | 5/1996 |
| WO | WO 00/22040 | 4/2000 |
| WO | 0248258 A2 | 6/2002 |
| WO | WO 03/066698 | 8/2003 |
| WO | WO 2004/048468 | 6/2004 |
| WO | WO 2005/002744 | 1/2005 |
| WO | WO 2005/014680 | 2/2005 |

OTHER PUBLICATIONS

Vieweg, et al., Polyolefine, Kunststoff Handbuch, Band IV, (1969), pp. 412-423, Carl Hanser Verlag, Munchen.
Vieweg, et al., Polyolefine, Kunststoff Handbuch, Band IV, (1969), pp. 39-51, Carl Hanser Verlag, Munchen.

* cited by examiner

*Primary Examiner* — Irina S Zemel
*Assistant Examiner* — Jeffrey Lenihan
(74) *Attorney, Agent, or Firm* — Milbank, Tweed, Hadley & McCloy LLP (57) ABSTRACT

According to one aspect, the present invention relates to a low-density polyethylene having a melt index $MFR_2$ of 2.5 to 10.0 g/10 min, a density of 910 to 935 kg/m$^3$, and a dynamic viscosity $\eta_{0.05}$ at a shear rate of 0.05 rad/s and a dynamic viscosity $\eta_{300}$ at a shear rate of 300 rad/s which satisfy the following relationship:

$$\eta_{300} \leq 108 \text{ Pa*s} + 0.0253 * \eta_{0.05}.$$

According to a second aspect, the present invention relates to a low-density polyethylene having a melt index $MFR_2$ of 2.5 to 10.0 g/10 min, a density of 910 to 935 kg/m$^3$, and a phase shift $\delta_{0.5}$ at a frequency of 0.5 rad/s and a phase shift $\delta_{300}$ at a frequency of 300 rad/s, which satisfy the following relationship:

$$\tan \delta_{300} \geq 0.45 + 0.164 * \tan \delta_{0.5}.$$

27 Claims, 3 Drawing Sheets

Figure 3

POLYETHYLENE BLEND COMPONENT AND BLENDS CONTAINING THE SAME

This application is a national stage application of International Application No. PCT/EP2006/008977, filed Sep. 14, 2006, the contents of which are hereby incorporated in their entireties and claims the priority to EP 05022688.5, filed Oct. 18, 2005.

BACKGROUND OF THE INVENTION

The present invention deals with polyethylene blends to be used in extrusion coating. In extrusion coating a thin film of polymer melt is extruded through a flat die and pressed onto a moving substrate. Extrusion coating is discussed, among others, in Vieweg, Schley and Schwarz: Kunststoff Handbuch, Band IV, Polyolefine, Carl Hanser Verlag (1969), pages 412 to 420. The substrate may be, among others, paper, paperboard, a plastic film or a metal film. The line speed in modern equipment can be very high, up to 1000 m/min or even more.

The high line speed sets heavy requirements for the material. Especially draw resonance is a problem often encountered with linear polymers, such as linear low density polyethylene (LLDPE), high density polyethylene (HDPE) or polypropylene (PP). At the onset of draw resonance large oscillations occur in the flow of the polymer melt through the die. Consequently, the coating becomes uneven and large holes may be observed in the coating. The draw resonance is due to the "tension thinning" behaviour of the linear polymers, where the elongational viscosity decreases with increasing tensile stress. On the other hand, highly branched polymers like LDPE exhibit strain hardening, where the elongational viscosity increases with increasing tensile stress.

1. Field of the Invention

The present invention deals with polymer blends to be used in extrusion coating process. Further, the present invention deals with low-density polyethylene to be used in such blends. The blends can be extrusion coated to different substrates at high line speeds and they have a reduced tendency to undergo draw resonance.

The low-density polyethylene according to the present invention can be used to make blends having an excellent processability. On the other hand, the advantageous properties of the other blend components present in the blend are maintained. Therefore, the low-density polyethylene according to present invention can be used to improve the processability of different blends having various advantageous properties, such as good optical properties, good sealing properties and good abrasion resistance. Further still, the blends have a low neck-in and excellent processability at high line speeds.

2. Description of Related Art

Document WO 2005/002744 discloses linear terpolymers suitable for extrusion coating. The linear polymers were blended with LDPE to obtain good processability.

Document EP 792318 discloses a blend of a linear polymer and an LDPE polymer to be used in extrusion coating. The LDPE has an $MFR_2$ of less than 6 g/10 min and a broad bimodal molecular weight distribution. Preferably the LDPE has $MFR_2$ of less than 1 g/10 min.

SUMMARY OF THE INVENTION

The objective of the present invention is to provide a low density ethylene polymer which can be blended with other polymers, preferably olefin polymers such as polyethylene or polypropylene, and more preferably linear homopolymers of ethylene and/or copolymers of ethylene and one or more alpha-olefin comonomers having from 3 to 20 carbon atoms, so that the blends can be processed in an extrusion coating line with a high line speed and minimum risk of draw resonance According to one embodiment of the present invention, there is provided a low density ethylene polymer having a melt index $MFR_2$ of from 2.5 to 10 g/10 min, especially from 2.5 to 6.5 g/10 min and in particular from 3 to less than 6 g/10 min, and a density of from 910 to 935 kg/m$^3$. In addition, $\eta_{0.05}$, the dynamic viscosity at a shear rate of 0.05 rad/s, and $\eta_{300}$, the dynamic viscosity at a shear rate of 300 rad/s, satisfy the following relationship:

$$\eta_{300} \leq 108 + 0.0253 \cdot \eta_{0.05}.$$

According to a second embodiment of the present invention, the object outlined above is solved by providing a low density ethylene polymer having a melt index $MFR_2$ of from 2.5 to 10 g/10 min, especially from 2.5 to 6.5 g/10 min and in particular from 3 to less than 6 g/10 min, a density of from 910 to 935 kg/m$^3$, and further having a $\delta_{0.5}$, the value of the tangent of the phase shift at a frequency of 0.5 rad/s, and $\delta_{300}$, the value of the tangent of the phase shift at a frequency of 300 rad/s, which satisfy the following relationship:

$$\tan \delta_{300} \geq 0.45 + 0.164 \cdot \tan \delta_{0.5}$$

DETAILED DESCRIPTION OF THE INVENTION

Low Density Polyethylene

Figure 1:
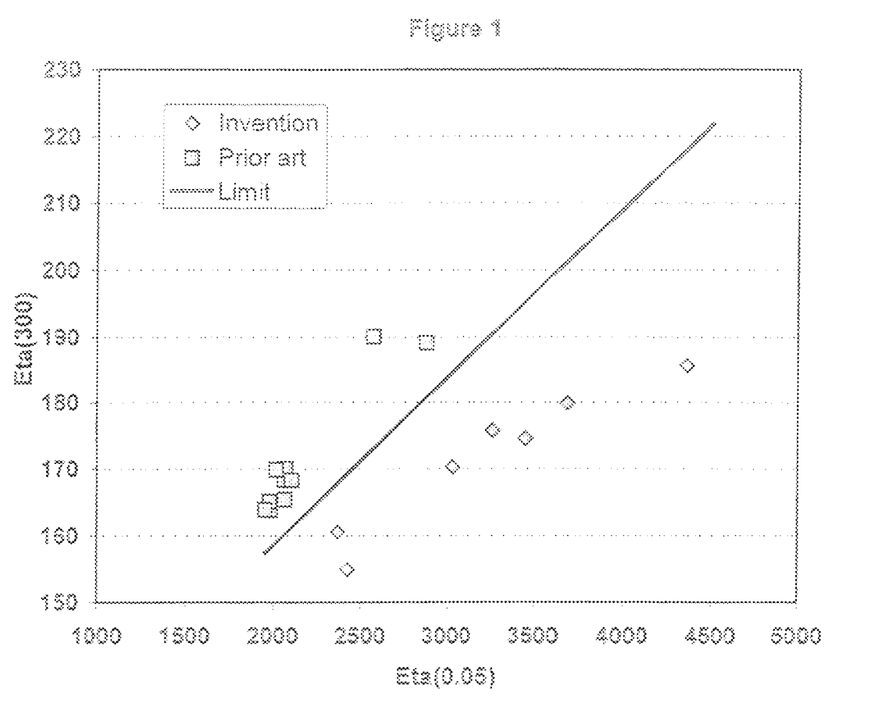
FIG. 1 shows a plot of $\eta_{0.5}$ and $\eta_{300}$ for the low density ethylene polymer according to the invention and commercial prior art polymers. The figure shows that the prior art polymers have a lower value of $\eta_{0.05}$ for a given value of $\eta_{300}$ than the polymers of the present invention. This suggests that the polymers of the present invention have a higher molecular weight and more long chain branches than the prior art polymers, even though the two polymers have substantially the same melt index
Figure 2:
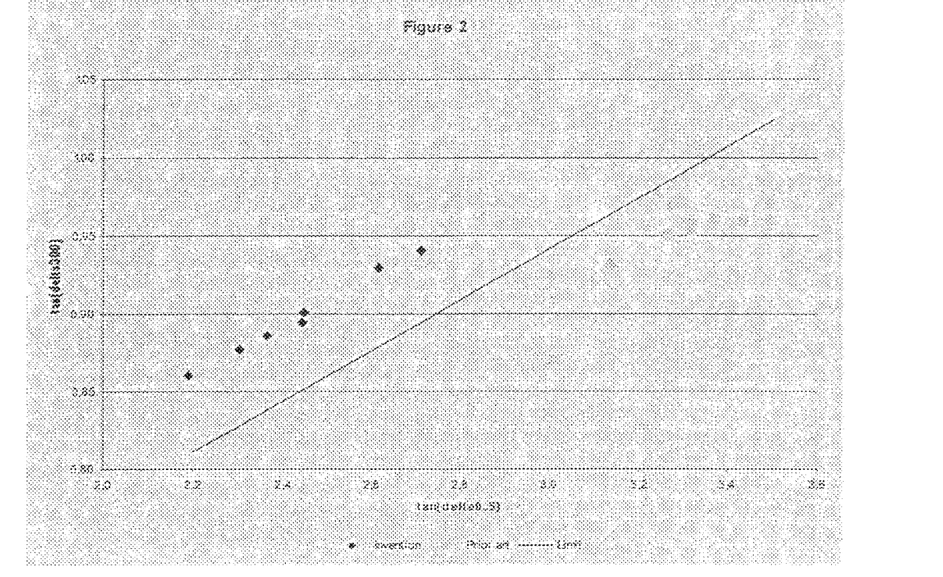
FIG. 2 shows a plot of $\delta_{0.5}$ and $\delta_{300}$ for the low density ethylene polymer according to the invention and commercial prior art polymers. The figure shows that the polymers of the present invention have a lower value of $\delta_{0.5}$ for a given value of tan $\delta_{300}$ than the prior art polymers. This indicates that the polymers of the present invention have a higher elasticity though they have substantially the same melt index.
Figure 3:
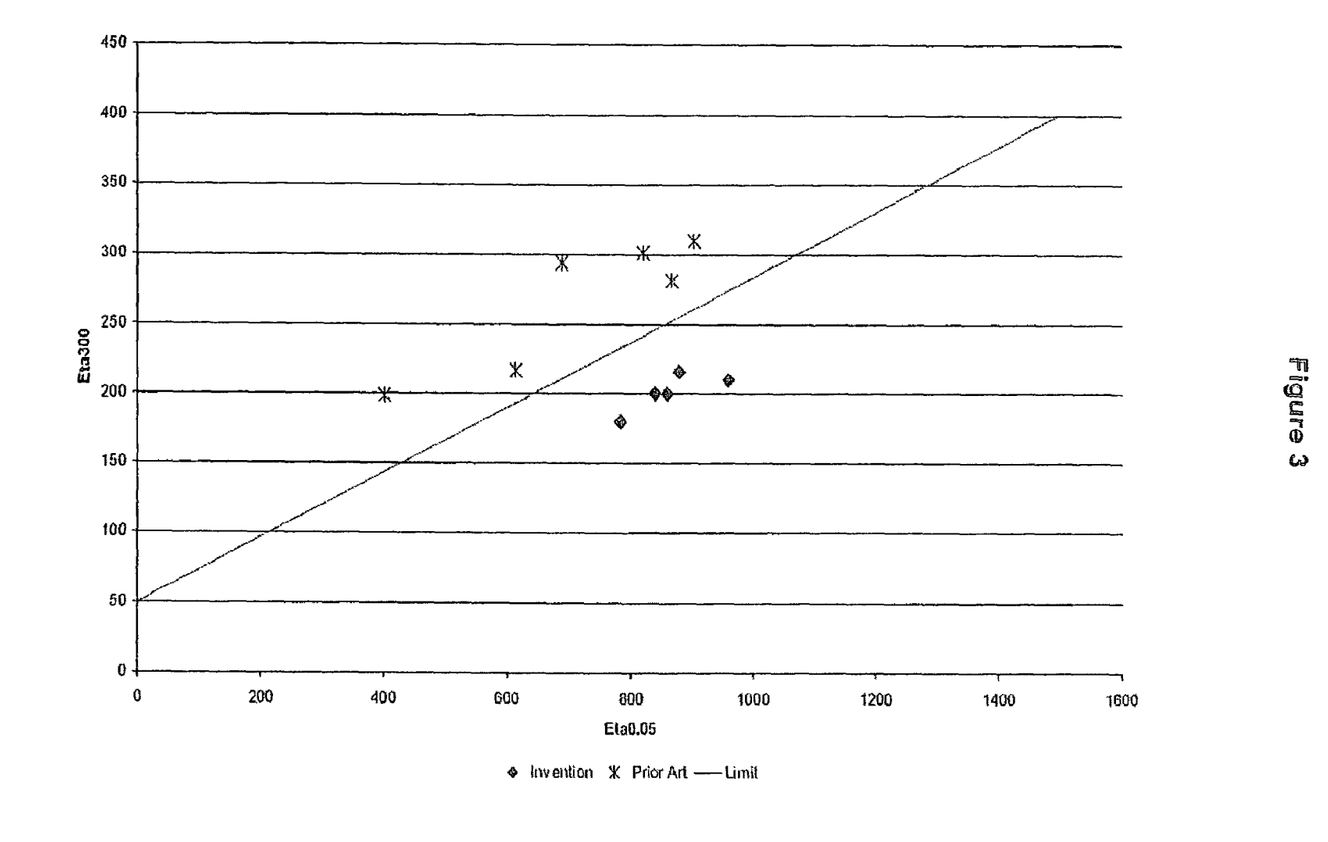
FIG. 3 shows a plot of $\eta_{0.05}$ and $\eta_{300}$ for blends comprising the low density ethylene polymer according to the invention and a bimodal linear low density polyethylene produced by polymerizing ethylene and one or more alpha-olefin comonomers in the presence of a metallocene catalyst in two polymerization stages as well as blends comprising the prior art low density polyethylene and a bimodal linear low density polyethylene.

Low density ethylene polymers contain long chain branches and are thus different from linear copolymers of ethylene and alpha-olefin comonomers produced in the presence of a Ziegler or a metallocene catalyst. Especially, the presence of the long chain branches causes clear differences in the rheological behaviour of the polymer.

The low density ethylene polymer according to a first embodiment of the present invention has a melt index $MFR_2$ of from 2.5 to 10 g/10 min, especially from 2.5 to 6.5 g/10 min and in particular from 3 to less than 6 g/10 min, a density of from 910 to 935 kg/m³, and $\eta_{0.05}$, the dynamic viscosity at a shear rate of 0.05 rad/s, and $\eta_{300}$, the dynamic viscosity at a shear rate of 300 rad/s, satisfy the following relationship:

$$\eta_{300} \leq 108 + 0.0253 \cdot \eta_{0.05}$$

Preferably, $\eta_{0.5}$ and $\eta_{300}$ satisfy the following relationship:

$$\eta_{300} \leq 102 \text{ Pa*s} + 0.0253 * \eta_{0.05}.$$

Preferably, $\delta_{0.5}$, the value of the tangent of the phase shift at a frequency of 0.5 rad/s, and $\delta_{300}$, the value of the tangent of the phase shift at a frequency of 300 rad/s, of the low density polyethylene satisfy the following relationship:

$$\tan \delta_{300} \geq 0.45 + 0.164 \cdot \tan \delta_{0.5}$$

According to a second aspect of the present invention, the object can alternatively be solved by providing a low density ethylene polymer having a melt index $MFR_2$ of from 2.5 to 10 g/10 min, especially from 2.5 to 6.5 g/10 min and in particular from 3 to less than 6 g/10 min, a density of from 910 to 935 kg/m³, and further having a $\delta_{0.5}$, the value of the tangent of the phase shift at a frequency of 0.5 rad/s, and $\delta_{300}$, the value of the tangent of the phase shift at a frequency of 300 rad/s, which satisfy the following relationship:

$$\tan \delta_{300} \geq 0.45 + 0.164 \cdot \tan \delta_{0.5}$$

In a preferred embodiment, $\eta_{0.5}$, the dynamic viscosity at a shear rate of 0.05 rad/s, and $\eta_{300}$, the dynamic viscosity at a shear rate of 300 rad/s, of the low density polyethylene satisfy the following relationship:

$$\eta_{300} \leq 108 + 0.0253 \cdot \eta_{0.05},$$

even more preferably the following relationship:

$$\eta_{300} \leq 102 \text{ Pa*s} + 0.0253 * \eta_{0.05}.$$

While it is not entirely clear what is the cause of the relationships between $\eta_{0.05}$ and $\eta_{300}$ and $\delta_{0.5}$ and $\delta_{300}$, it is believed that the low density ethylene polymer has a higher content of long chain branches per 1000 atoms in the polymer backbone than the traditional low density polyethylenes of the prior art.

The following statements are applicable to both embodiments of the present invention.

Preferably, the low density ethylene polymer has a dynamic viscosity at a shear rate of 0.05 rad/s, $\eta_{0.05}$, of from 1000 to 10000 Pa*s, more preferably from 1500 to 7000 Pa*s and in particular from 2000 to 5000 Pa*s.

Further still, the low density ethylene polymer has a value of tan $\delta_{0.5}$, the value of the tangent of the phase shift at a frequency of 0.5 rad/s of from 1.5 to 3.0, more preferably from 1.9 to 2.8, and a value of $\delta_{300}$, the value of the tangent of the phase shift at a frequency of 300 rad/s of from 0.8 to 1.0, more preferably from 0.85 to 0.95.

Preferably still, the low density ethylene component has a shear thinning index $SHI_{1/100}$ of from 20 to 60, more preferably from 30 to 50. It is also preferred that the low density ethylene polymer has a number average molecular weight, $M_n$, of from 8000 to 30000 g/mol, more preferably from 10000 to 25000. Also, it preferably has a weight average molecular weight, $M_w$, of from 400000 to 600000 g/mol, preferably from 470000 to 540000 g/mol. It is also preferred that it has a z-average molecular weight, $M_z$, of from 2000000 to 4000000 g/mol, more preferably from 2500000 to 3500000 g/mol. It also preferably has a molecular weight distribution, defined as a ratio of the weight average molecular weight to the number average molecular weight, $M_w/M_n$, of from 20 to 50, more preferably from 25 to 40.

Preferably, the low-density polyethylene has a storage modulus G'(5 kPa), measured at a loss modulus G" of 5 kPa, within the range of 3000 to 3600 Pa, more preferably 3200 to 3500 Pa.

Components to be Blended with the Low Density Polyethylene

The low density ethylene polymer can be blended with other polymers. Especially advantageously, the low density ethylene polymer is blended with olefin polymers produced by polymerising olefins in the presence of transition metal polymerisation catalysts. Examples of such polymers are homo- and copolymers of ethylene, homo- and copolymers of propylene and homo- and copolymers of 1-butene. In particular, the blends of the low density ethylene polymer with copolymers of two or more olefins are preferred. The most preferred blends are those with copolymers of ethylene with one or more alpha-olefin copolymers having from 3 to 20 carbon atoms and which are produced by copolymerising ethylene with at least one such olefin in the presence of a single site catalyst, such as a metallocene catalyst.

The low density polyethylene and the one or more polyolefins blended therewith differ in at least one property. Preferably, the added polyolefins do not satisfy the relationship according to claim 1 and/or claim 2.

The ethylene copolymers have preferably a density of less than 930 kg/m³, and more preferably less than 925 kg/m³. Especially preferred are bimodal copolymers of ethylene and at least two alpha-olefin comonomers, like those disclosed in WO 2005/002744 and WO 03/66698.

Thus, in a particularly preferred embodiment of the invention one blend component is a multimodal linear low density polyethylene. The multimodal linear low density polyethylene component has a melt index $MFR_2$ of from 3 to 40 g/10 min, preferably from 5 to 30 g/10 min and more preferably from 10 to 30 g/10 min. Also, the multimodal linear low density polyethylene has a density of from 900 to 935 kg/m³, preferably from 910 to 925 kg/m³ and more preferably from 912 to 922 kg/m³. Preferably, the multimodal linear low density ethylene polymer has been produced by polymerising ethylene and at least one alpha-olefin comonomer having from 4 to 10 carbon atoms in at least two polymerisation stages in the presence of a single site polymerisation catalyst, such as a metallocene catalyst.

The low molecular weight component of the multimodal linear low density polyethylene comprises from 30 to 70% by weight, preferably 40 to 60%, of the multimodal linear low density polyethylene component. It has a weight average molecular weight which is lower than that of the multimodal linear low density polyethylene so that the low molecular weight component has a melt index $MFR_2$ which is higher than that of the multimodal linear low density polyethylene. Preferably the weight average molecular weight of the low molecular weight component is such that it corresponds to the melt index $MFR_2$ of about 20 to 800 g/10 min, more preferably from 50 to 300 g/min. Further, the low molecular weight component has a lower content of alpha-olefin comonomer(s) than the multimodal linear low density polyethylene and the content of alpha-olefin comonomers is preferably such that it corresponds to the density of from 930 to 950 kg/m³, more preferably from 930 to 940 kg/m³.

The high molecular weight component of the multimodal linear low density polyethylene comprises from 70 to 30% by weight, preferably from 60 to 40% of the multimodal linear low density polyethylene component. It has a weight average molecular weight which is higher than that of the multimodal linear low density polyethylene so that the high molecular weight component has a melt index $MFR_2$ which is lower than that of the multimodal linear low density polyethylene. Preferably the weight average molecular weight of the high molecular weight component is such that it corresponds to the melt index $MFR_2$ of about 0.01 to 5 g/10 min, more preferably from 0.05 to 3 g/min. Further, the high molecular weight component has a higher content of alpha-olefin comonomer(s) than the multimodal linear low density polyethylene and the content of alpha-olefin comonomers is preferably such that it corresponds to the density of from 880 to 915 kg/m³, more preferably from 890 to 910 kg/m³. Especially the high molecular weight component should have such weight average molecular weight and comonomer content that the multimodal linear low density polyethylene has the desired melt index and density.

Especially preferably, the multimodal linear low density polyethylene has been produced by polymerising ethylene and at least two alpha-olefin comonomers having from 3 to 20, preferably from 4 to 10, carbon atoms in at least two polymerisation stages in the presence of a single site polymerisation catalyst, such as a metallocene catalyst. Then it is possible either to feed a different alpha-olefin comonomer to each polymerisation stage or to feed at least two different alpha-olefin comonomers into one polymerisation stage, which preferably is the stage where the high molecular weight component is produced.

In addition the blend may contain minor amount of other polymers, provided that the end properties of the blend are not negatively affected. Further, the blend may contain antioxidants, stabilizers and other additives known in the art, depending on the desired properties of the final blend.

Blends

Preferably, the blend includes the low density ethylene polymer in an amount of from 5 to 40% by weight, based on the total weight of the blend. More preferably, it comprises from 10 to 35% by weight of the low density ethylene polymer and in particular of from 20 to 35%. In addition to the low density ethylene polymer component, the blend preferably comprises of from 60 to 95% by weight, more preferably from 65 to 90%, and in particular from 65 to 80% of at least one linear ethylene homopolymer or a copolymer of ethylene with one or more alpha-olefin comonomers having from 3 to 20 carbon atoms.

Specifically, the blends have good sealing properties and good mechanical properties, such as excellent ESCR, combined with good processability. Especially preferably the blends have a high viscosity at low shear rates, because then the polymer has sufficient melt strength to avoid the melt from breaking during the extrusion process. Also, the polymer is not likely to undergo draw resonance which makes it readily processable. On the other hand, the blends have a relatively low viscosity at high shear rates, meaning that they can be processed with a high line speed exceeding 500 m/min. Thus, the blends according to the invention preferably have a value of the dynamic viscosity $\eta_{0.5}$ of more than 400 Pas. Further, the blends have a value of the dynamic viscosities $\eta_{300}$ and $\eta_{0.5}$ meeting the following condition:

$$\eta_{300} \leq 0.233 \cdot \eta_{0.5} + 50$$

A specially preferred embodiment of the invention comprises a blend including from 5 to 60%, preferably from 5 to 40%, more preferably from 10 to 35% and in particular from 20 to 35% of LDPE and from 95 to 40%, preferably from 95 to 60%, more preferably from 90 to 65% and in particular from 80 to 65% of a multimodal linear low density polyethylene comprising a low molecular weight component and high molecular weight component and which is obtainable by polymerising ethylene and one or more alpha-olefin comonomers in the presence of a single site catalyst in at least two polymerisation stages. The properties of the multimodal linear low density polyethylene and its components were discussed above.

In addition the blends preferably have a value of $\delta_{0.5}$, the value of the tangent of the phase shift at a frequency of 0.5 rad/s of about 10 or less, or a value of $\delta_{300}$, the value of the tangent of the phase shift at a frequency of 300 rad/s of about 2.0 or less, more preferably from 1.0 to 2.0.

Preferably still, the blends have a density within the range of from 900 kg/m³ to 965 kg/m³. Where good sealing properties are desired it is preferable that the density is from 900 to 935 kg/m³, more preferably from 910 to 925 kg/m³ and especially preferably 915 to 922 kg/m³. It is also preferred that the density, ρ, and the melting temperature, $T_m$, of the blend satisfy the following relationship:

$$T_m \geq 1.6 \cdot \rho - 1360$$

where ρ is given in kg/m3 and $T_m$ in ° C.

In addition it is preferred that the blends have a melt index $MFR_2$ of from 2 to 50 g/10 min, more preferably from 3 to 30 g/10 min and especially from 5 to 25 g/10 min.

Use of the Blends

The blends are advantageously used in extrusion coating and cast film extrusion. The blends are especially useful in extrusion coating where they exhibit a number of advantageous features. First, the blends have a good processability and they can be used in coating lines having a line speed of at least 200 m/min, preferably at least 400 m/min and in particular at least 500 m/min. When used in the coating process they exhibit a reduced risk of draw resonance and an even distribution of the coating is obtained. These two features allow a high throughput in the coating line with a good product quality.

In addition the blends exhibit a low neck-in when used in extrusion coating. In particular, the neck-in remains essentially constant or even decreases when the line speed increases, which results in better coating performance at higher throughput. A low neck-in leads to a low amount of wasted substrate material, as the uncoated part of the substrate needs to be cut off and discarded.

The substrate to be coated can be any substrate known in the art, such as paper, paperboard, Kraft paper, metal foil, plastic foil and cellophane foil. To improve the adhesion between the substrate and the plastic layer the methods commonly known in the art may be used, such as ozone treatment of the molten polymer film, flame treatment and corona treatment of the substrate, an adhesive layer may be used, and an adhesion promoter may be used.

Production of the LDPE Blend Component

The low density polyethylene is produced in a high pressure process. In such processes ethylene is polymerised at an elevated temperature of from 150 to 350° C. and at a high pressure of from 1000 to 3000 bar. The polymerisation reaction is initiated by using free radical initiators. Ethylene and at least one initiator are introduced into the reactor at a high temperature and pressure. The polymerisation reaction occurs in solution comprising ethylene in a supercritical state and polyethylene dissolved therein in a short time, typically less than 10 minutes and usually from about 30 seconds to about 5 minutes. The reaction mixture including the polymer is withdrawn from the reactor, unreacted ethylene is removed from the solution and the polymer melt is extruded, cooled, cut into pellets and recovered. A short description of high pressure processes for ethylene polymerisation is given, among others, in Vieweg, Schley and Schwarz: Kunststoff Handbuch, Band IV, Polyolefine, Carl Hanser Verlag (1969), pages 39 to 51.

Polymerisation Process

Preferably the polymerisation process is conducted in an autoclave reactor. The autoclave reactor is a continuously operating stirred reactor. In such reactors it is common to have multiple entry points for ethylene and initiator. Usually there is one withdrawal point for the polymer solution, but it is possible to have also multiple product withdrawal points.

Thus, the autoclave reactor can be considered to comprise different zones. A first zone is located in the upstream part of the reactor and the first ethylene and initiator feeds occur in this zone. A second zone is located downstream of the first zone, and ethylene and initiators are also introduced into the second zone. A third zone is located further downstream of the second zone. Into the third zone ethylene is introduced and also minor amounts of initiator may be introduced, even though this is not necessarily done. Downstream of the third zone is a fourth zone, from which the reaction product is withdrawn. Ethylene may be introduced into the fourth zone also. However, initiator is not usually introduced into the fourth zone.

Because the high viscosity of the reaction mixture and low heat transfer area the heat transfer through the autoclave wall is usually insufficient to remove the heat of the reaction. Therefore, the most useful way to control the temperature in the polymerisation reactor is by ethylene and initiator feeds to the different zones. Such methods are known to the person skilled in high pressure ethylene polymerisation technology.

In the preparation of the LDPE polymer according to the present invention the polymerisation is preferably conducted at a pressure of 1200 to 2000 bar, more preferably from 1350 to 1700 bar. The temperature within the autoclave is preferably from 230 to 300° C. More preferably, the temperature in the first zone of the reactor is from 230 to 255° C., and the temperature in the fourth zone of the reactor is from 270 to 300° C.

Initiators

The initiators commonly known in the art may be employed. While the low density ethylene polymer of the invention may be produced with one initiator only, it is preferred to use multiple initiators, which are introduced to different entry points in the reactor. Typically, the initiators are introduced into the first and second zones of the reactor. Especially preferably, a first initiator or a mixture of first initiators is introduced into the first zone and/or the second zone of the reactor and a second initiator or a mixture of second initiators is introduced into the second zone and/or third zone of the reactor. Preferably the first initiator or the first mixture of initiators comprises from about 50 to 80%, more preferably from 60 to 75% by weight of the total amount of the initiators, and the second initiator or the second mixture of initiators comprises from about 20 to 50%, more preferably from 25 to 40% by weight of the total amount of the initiators.

Compounds suitable to be used as the first initiator preferably have a half-life of 0.1 hours at a temperature within the range of from 120 to 152° C., a half life of 1 hour at a temperature within the range of from 100 to 131° C. and a half life of 10 hours at a temperature within the range of from 81 to 111° C. As the person skilled in the art knows, the half-life of 1 hour at a certain temperature means that at that temperature 50% of the initial amount of initiator has decomposed after one hour. Examples of compounds suitable to be used as the first initiator are, among others, tert-butyl peroxyacetate (CAS number 107-71-1), tert-butylperoxy-2-ethylhexyl carbonate (34443-12-4), tert-butyl peroxy-benzoate (614-45-9), tert-butylperoxy isopropyl carbonate (2372-21-6), 2,2-di (tert-butylperoxy)butane (2167-23-9) and tert-butylperoxy-3,5,5-trimethylhexaonate (13122-18-4).

Compounds suitable to be used as the second initiator preferably have a half-life of 0.1 hours at a temperature within the range of from 152 to 200° C., a half life of 1 hour at a temperature within the range of from 131 to 170° C. and a half life of 10 hours at a temperature within the range of from 111 to 141° C. Examples of such compounds are, among others, di-tert-butylperoxide (110-05-4), 3,6,9-triethyl-3,6,9-trimethyl-1,4,7-triperoxononane (24748-23-0), isopropylcumyl hydroperoxide (26762-93-6) and cumyl hydroperoxide (80-15-9).

Extrusion

After the polymer is collected from the reactor and the hydrocarbon residues are removed therefrom, the polymer is compounded and extruded to pellets. In this process step, any extruder known in the art may be used. The extruder may contain one or more gear pumps and throttle valves. This equipment can be used to improve the homogeneity of the polymer composition or to increase the capacity of the extruder. Before the extrusion the polymer may be mixed with the desired additives.

Description of Analytical Methods

Molecular Weight

Average molecular weights and molecular weight distribution were determined by size exclusion chromatography (SEC) using Waters Alliance GPCV2000 instrument with on-line viscometer. Oven temperature was 140° C. Trichlorobenzene was used as a solvent.

Melt Flow Rate

Melt flow rate of the polymer was determined according to ISO 1133 at 190° C. under a load of 2.16 kg ($MFR_2$).

Density

Density of the polymer was determined according to ISO 1183-1987.

Comonomer Content

Comonomer content (wt %) was determined in a known manner with $^{13}$C-NMR on Bruker 400 MHz spectrometer at 130° C. from samples dissolved in 1,2,4-trichlorobenzene (TCB)/benzene (with 90 parts per weight TCB and 10 parts per weight benzene).

Dynamic Viscosity and Shear Thinning Index

Dynamic rheological measurements were carried out with a rheometer, namely Rheometrics RDA-II, on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade are made.

The values of storage modulus (G'), loss modulus (G") complex modulus (G*) and complex viscosity ($\eta^*$) were obtained as a function of frequency ($\omega$). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11$^{th}$ (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

SHI value is obtained by calculating the complex viscosities $\eta^*(1\,kPa)$ and $\eta^*(100\,kPa)$ at a constant value of complex modulus of 1 kPa and 100 kPa, respectively. The shear thinning index SHI1/100 is defined as the ratio of the two viscosities $\eta^*(1\,kPa)$ and $\eta^*(100\,kPa)$, i.e. $\eta(1)/\eta(100)$.

The definitions and measurement conditions are also described in detail on page 8, line 29 to page 11, line 25 of WO 00/22040.

It is usually not practical to measure the complex viscosity at the value of frequency of 0.05 rad/s directly. The value can be extrapolated by conducting the measurements down to the frequency of 0.126 rad/s, drawing the plot of complex viscosity vs. frequency, drawing a best-fitting line through the five points corresponding to the lowest values of frequency and reading the viscosity value from this line.

The phase shift $\delta$ indicates how much the dynamic response measured from the polymer is shifted with respect to the input signal. The phase shift is given in radians. The frequency which was used in the measurement is indicated as a subscript. Thus, $\delta_{0.5}$ indicates the phase shift measured at 0.5 rad/s frequency. Often the value of tan $\delta$, i.e. the tangent of the phase shift, is used instead of $\delta$.

Neck-in

Neck-in was determined as the difference between the width of the die and the width of the coating on the substrate.

Basis Weight

Basis weight was determined as follows: Five samples were cut off from the extrusion coated paper parallel in the transverse direction of the line. The size of the samples was 10 cm×10 cm. The samples were put into a solvent for 10-30 minutes, after which the paper was removed from the plastic and the solvent was allowed to evaporate. The samples were then weighed and the average was calculated. The result was given as a weight of the plastic per square meter.

Melting Temperature $T_m$ $T_m$ and $T_{cr}$ were measured with Mettler TA820 differential scanning calorimetry (DSC) on 3±0.5 mg samples. Both crystallization and melting curves were obtained during 10° C./min cooling and heating scans between –10-200° C. Melting and crystallization temperatures were taken as the peaks of endotherms and exotherms.

Extrusion Coating Runs

Max RPM denotes the maximum RPM value of the extruder motor when preparing the coating. The higher the value, the better is the processability and the higher is the throughput of the polymer.

Max line speed indicates the maximum line speed of the web in m/min where stable coating run was still obtained.

Draw resonance indicates if any sign of draw resonance was observed. Such signs are, for instance, oscillations in the edge of the coating and variations in the thickness of the coating.

EXAMPLES

Example 1

A polymerisation reactor of autoclave type was used. Ethylene was introduced into the reactor to the different levels so that the temperatures at each level were as indicated in Table 1. Two initiators were used so that initiator 1 was introduced to levels 9 and 7 and initiator 2 into level 5. Initiator 1 was a peroxide having a half-life of 0.1 hours at a temperature of 142° C., a half-life of 1 hour at a temperature of 122° C. and a half-life of 10 hours at a temperature of 103° C. Initiator 2 had a half-life of 0.1 hours at a temperature of 164° C., a half-life of 1 hour at a temperature of 141° C. and a half-life of 10 hours at a temperature of 121° C. The pressure within the reactor was 1500 bar and the temperature at the different levels was from 242 to 248° C. The conditions can be seen in Table 1.

The polymer collected from the reactor was extruded into pellets. It had MFR$_2$ of 4.5 g/10 min and a density of 917 kg/m$^3$. It had further $\eta_{0.05}$ of 3690 Pa·s and $\eta_{300}$ of 180 Pa·s. The value of tan $\delta$ at frequencies of 0.5 and 300 rad/s was 2.3 and 0.88, respectively. G' (5 kPa) was 3433 Pa. It further had M$_n$ of 17500 g/mol, M$_w$ of 629000 g/mol and Mz of 3520000 g/mol. The polydispersity index, M$_w$/M$_n$ was thus 36.

TABLE 1

| reactor conditions | | |
|---|---|---|
| Reactor condition | Unit | Value |
| Temperature, level 9 | ° C. | 242 |
| Temperature, level 8 | ° C. | 242 |
| Temperature, level 7 | ° C. | 242 |
| Temperature, level 6 | ° C. | 252 |
| Temperature, level 5 | ° C. | 259 |
| Temperature, level 4 | ° C. | 275 |
| Temperature, level 3 | ° C. | 280 |
| Temperature, level 2 | ° C. | 281 |
| Temperature, level 1 | ° C. | 284 |
| Pressure | bar | 1516 |
| Initiator feed, level 9 | kg/h | 25 |
| Initiator feed, level 7 | kg/h | 17.5 |
| Initiator feed, level 5 | kg/h | 17.5 |
| Initiator feed, level 3 | Kg/h | 3 |
| Production rate | t/h | 8.5 |

Example 2

The procedure of Example 1 was repeated except that the conditions were slightly varied to produce a polymer having an MFR$_2$ of 6.5 g/10 min and density of 917 kg/m$^3$. The resulting LDPE polymer had further $\eta_{0.05}$ of 2369 Pa·s and $\eta_{300}$ of 161 Pa·s. The value of tan $\delta$ at frequencies of 0.5 and 300 rad/s was 2.6 and 0.93, respectively. G' (5 kPa) was 3307 Pa.

Example 3

The catalyst was prepared according to the instructions of Catalyst Preparation Example 2 of WO 2005/002744.

A continuously operating loop reactor having a volume of 500 dm$^3$ was operated at 85° C. temperature and 60 bar pressure. Into the reactor were introduced propane diluent, ethylene, 1-butene comonomer, hydrogen and the polymerisation catalyst prepared according to Catalyst Preparation Example 2 referred to above in such amounts that the ethylene concentration in the liquid phase of the loop reactor was 7% by mole, the ratio of hydrogen to ethylene was 0.65 mol/kmol, the ratio of 1-butene to ethylene was 155 mol/kmol and the polymer production rate in the reactor was 25 kg/h. The thus formed polymer had a melt index MFR2 of 140 g/10 min and a density of 935 kg/m$^3$.

The slurry was intermittently withdrawn from the reactor by using a settling leg and directed to a flash tank operated at a temperature of about 50° C. and a pressure of about 3 bar.

From the flash tank the powder, containing a small amount of residual hydrocarbons, was transferred into a gas phase reactor operated at 75° C. temperature and 20 bar pressure. Into the gas phase reactor were also introduced additional ethylene, 1-hexene comonomer and nitrogen as inert gas in such amounts that the ethylene concentration in the circulating gas was 22% by mole, the ratio of hydrogen to ethylene was about 0.7 mol/kmol, the ratio of 1-hexene to ethylene was 18 mol/kmol and the polymer production rate was 25 kg/h.

The production split between the loop and gas phase reactors was thus 50/50.

Example 4

The polymer of Example 3 was stabilised by adding to the powder 400 ppm Irganox B561. The stabilised polymer was then mixed with polymer pellets obtained from Example 1 so that the content of LDPE from Example 1 was 25% by weight of the total blend. The mixture was then extruded and pelletised under nitrogen atmosphere with a CIM90P extruder, manufactured by Japan Steel Works. The melt temperature was about 200° C., throughput 280 kg/h and the specific energy input (SEI) was 200 kWh/t.

The polymer pellets had a melt index $MFR_2$ of 15 g/10 min, a density of 920 kg/m$^3$, a 1-butene content of 2.1% by weight and a content of 1-hexene of 6.3% by weight. The melting temperature of the blend was 115° C. More data is shown in Table 2.

Comparative Example 1

The polymer of Example 3 was mixed with 25% of CA8200, which is an LDPE polymer manufactured and sold by Borealis. CA8200 had $MFR_2$ of 7.5 g/10 min and density of 920 kg/m$^3$. Furthermore $\eta_{0.05}$ is 2062 Pa·s, $\eta_{300}$ is 168 Pa·s, tan $\delta_{0.5}$ is 3.4 and tan $\delta_{300}$ is 0.96, respectively. The melting temperature was 106.6° C.

The resulting blend had a density of 920 kg/m$^3$ and an $MFR_2$ of 24 g/10 min.

Example 5

The procedure of Example 3 was repeated except that the conditions in the gas phase reactor were varied so that the polymer powder withdrawn from the gas phase reactor had a melt index $MFR_2$ of 23 g/10 min and a density of 920 kg/m$^3$.

Example 6

The procedure of Example 3 was repeated except that the conditions in the gas phase reactor were varied so that the polymer powder withdrawn from the gas phase reactor had a melt index $MFR_2$ of 24 g/10 min and a density of 918 kg/m$^3$.

Example 7

The procedure of Example 4 was followed except that the polymers of Example 2 and Example 5 were used in place of polymers of Examples 1 and 3, respectively. The properties of the blend are shown in Table 2.

Example 8

The procedure of Example 4 was followed except that the polymer of Example 5 was used in place of the polymer of Example 3. The properties of the blend are shown in Table 2.

Example 9

The procedure of Example 7 was followed except that the polymer of Example 6 was used in place of polymer of Example 3. The properties of the blend are shown in Table 2.

Comparative Example 2

The blend was produced as disclosed in Example 9 of WO 2005/002744. The LDPE polymer CA8200 was as disclosed in Comparative Example 1 above.

Comparative Example 3

The blend was produced as disclosed in Example 10 of WO 2005/002744. The LDPE polymer CA8200 was as disclosed in Comparative Example 1 above.

Comparative Example 4

The blend was produced as disclosed in Example 11 of WO 2005/002744. The LDPE polymer CA8200 was as disclosed in Comparative Example 1 above.

TABLE 2

| | Data of polymer blends | | | | | | | |
|---|---|---|---|---|---|---|---|---|
| Example | 4 | 7 | 8 | 9 | CE1 | CE2 | CE3 | CE4 |
| $MFR_2$ g/10 min | 15 | 16 | 15 | 17 | 24 | 11 | 11 | 11 |
| Density, kg/m$^3$ | 920 | 920 | 920 | 919 | 920 | 918 | 919 | 919 |
| $\eta_{0.5}$, Pa·s | 961 | 841 | 861 | 784 | 615 | 690 | 821 | 869 |
| $\eta_{300}$, Pa·s | 210 | 200 | 200 | 180 | 217 | 294 | 301 | 281 |
| tan$\delta_{0.5}$ | 7.2 | 7.6 | 7.9 | 7.9 | | 11 | 8.6 | 6.4 |
| tan$\delta_{300}$ | 1.29 | 1.34 | 1.34 | 1.34 | 1.5 | 1.6 | 1.5 | 1.45 |
| $T_m$ ° C. | 115 | | | | | | | |

Example 10

Extrusion coating runs were made on Beloit coextrusion coating line. It had a Peter Cloeren's die and a five layer feed block. The width of the line was 850-1000 mm and the maximum line speed was 1000 m/min (design value).

In the coating line above a UG kraft paper having a basis weight of 70 g/m$^2$ was coated with a layer of the polymer blends prepared according to the Examples 4, 7 to 9 and Comparative Examples 1 to 4 above, having a basis weight of 10 g/m$^2$. The temperature of the polymer melt was set to 300° C. The line speed was gradually increased to evaluate the processability. It was found out that all the blends could be processed at a line speed of more than 500 m/min. Only the Comparative Example 1 gave some indication of draw resonance at the highest line speed, observed as a slight oscillation of the edges of the coating.

TABLE 2

| Condition | Unit | E4 | E7 | E8 | E9 | CE1 | CE2 | CE3 | CE4 |
|---|---|---|---|---|---|---|---|---|---|
| Extrusion coating conditions | | | | | | | | | |
| Max line speed | m/min | >500 | >600 | >600 | >500 | >500 | >500 | >500 | >500 |
| Draw resonance (at highest line speed) | | No | No | No | No | Slight | No | No | No |
| Neck-in (at 300 m/min) | mm | 100 | 95 | 99 | 102 | 153 | 255 | 199 | 142 |
| Neck-in (at 500 m/min) | mm | 95 | | | | 165 | | | |
| Basis weight | g/m2 | 11 | 11 | 11 | 11 | 11 | 11 | 11 | 11 |
| Max RPM | RPM | | 191 | 187 | 196 | 220 | 131 | 127 | 145 |

It can be seen that the blends of the invention have a substantially reduced neck-in compared with the prior art blends. It also can be seen that in Example 4 the neck-in reduced when increasing the line speed whereas Comparative Example 1 showed the opposite behaviour, which is typical for prior art blends.

The invention claimed is:

1. A polymer blend comprising:
   (a) 5 to 60 wt. % of a low-density polyethylene, having:
      a melt $MFR_2$ of 2.5 to 10.0 g/10 min index;
      a density of 910 to 935 kg/m³, and
      a dynamic viscosity $\eta_{0.05}$ at a shear rate of 0.05 rad/s and a dynamic viscosity $\eta_{300}$ at a shear rate of 300 rad/s which satisfy the following relationship:

$$\eta_{300} \leq 108\ Pa{*}s + 0.0253{*}\eta_{0.05}$$

and
   (b) 40 to 95 wt % of a multimodal linear low density polyethylene prepared in the presence of a transition metal catalyst and which comprises:
      30 to 70 wt %, based on the total multimodal linear low density ethylene polymer, of a low molecular weight component having a density of from 930 to 950 kg/m³, and
      70 to 30 wt %, multimodal linear low density ethylene polymer, of a high molecular weight component having a density of from 880 to 915 kg/m³.

2. A polymer blend comprising:
   (a) 5 to 60 wt. % of a low-density polyethylene, having:
      a melt index $MFR_2$ of 2.5 to 10.0 g/10 min,
      a density of 910 to 935 kg/M³, and
      a phase shift $\delta_{0.5}$ at a frequency of 0.5 rad/s and a phase shift $\delta_{300}$ at a frequency of 300 rad/s, which satisfy the following relationship:

$$\tan \delta_{300} \geq 0.45 + 0.164{*}\tan \delta_{0\ldots 5}$$

and
   (b) 40 to 95 wt % of a multimodal linear low density polyethylene prepared in the presence of a transition metal catalyst and which comprises:
      30 to 70 wt %, based on the total multimodal linear low density ethylene polymer, of a low molecular weight component having a density of from 930 to 950 kg/m³, and
      70 to 30 wt %, multimodal linear low density ethylene polymer, of a high molecular weight component having a density of from 880 to 915 kg/m³.

3. The polymer blend of claim 1, wherein the low-density polyethylene, simultaneously satisfies the following relationships:

$$\eta_{300} \leq 108\ Pa{*}s\ 0.0253{*}\eta_{0.05}, \text{ and}$$

$$\tan \delta_{300} \geq 0.45 + 0.164{*}\tan \delta_{0\ldots 5}.$$

4. The polymer blend according to claim 1, wherein the low-density polyethylene has a melt index $MFR_2$ is within the range of 2.5 to 6.5 g/10 min.

5. The polymer blend according to claim 1, wherein the low-density polyethylene has a dynamic viscosity $\eta_{0.05}$ at a shear rate of 0.05 rad/s is within the range of 1000 to 10000 Pa*s.

6. The polymer blend according to claim 1, wherein the low-density polyethylene has a tan $\delta_{0.5}$ at a frequency of 0.5 rad/s within the range of 1.5 to 3.0.

7. The polymer blend according to claim 1, wherein the low-density polyethylene has a tan $\delta_{300}$ at a frequency of 300 rad/s within the range of 0.8 to 1.0.

8. The polymer blend according to claim 1, wherein the low-density polyethylene has a shear thinning index $SHI_{1/100}$ of 20 to 60.

9. The polymer blend according to claim 1, wherein the low-density polyethylene has a number average molecular weight $M_n$ of 8000 to 30000 g/mol.

10. The polymer blend according to claim 1, wherein the low-density polyethylene has a weight average molecular weight $M_n$ of 400000 to 600000 g/mol.

11. The polymer blend according to claim 1, wherein the low-density polyethylene has a z-average molecular weight $M_z$ of 2000000 to 4000000 g/mol.

12. The polymer blend according to claim 1, wherein the low-density polyethylene has a molecular weight distribution $M_w/M_n$ of 20 to 50.

13. The polymer blend according to claim 1, wherein the low-density polyethylene has a storage modulus G'(5 kPa), measured at a loss modulus G" of 5 kPa, within the range of 3000 to 3600 Pa.

14. The polymer blend according to claim 1, wherein the multimodal linear low density polyethylene has a melt index $MFR_2$ of from 3 to 40 g/10 min.

15. The polymer blend according to claim 1, wherein the multimodal linear low density polyethylene has a density from 900 to 935 kg/m³.

16. The polymer blend according to claim 1, wherein the multimodal linear low density polyethylene has been produced by polymerising ethylene and at least one alpha-olefin comonomer having from 4 to 10 carbon atoms in the presence of a single site polymerisation catalyst.

17. The polymer blend according to claim 1, wherein the blend has a value of the dynamic viscosities $\eta_{300}$ and $\eta_{0.5}$ meeting the following condition: $\eta_{300} \leq 0.233 \cdot n_{0.5} + 50$.

18. The polymer blend according to claim 1, wherein the blend has a value of tan $\delta_{0.5}$ of about 10 or less.

19. The polymer blend according to claim 1, wherein the blend has a value of tan $\delta_{300}$ of about 2.0 or less.

20. The polymer blend according to claim 1, wherein the blend has a density within the range from 900 kg/m³ to 965 kg/m³.

21. The polymer blend according to claim 1, wherein the density, ρ, and the inciting temperature, $T_m$, of the blend satisfy the following relationship:

$$T_m \geq 1.6 \cdot \rho - 1360.$$

22. A polymer blend, comprising:

5 to 60 wt % of a low-densitypolyethylene, having:
- a melt $MFR_2$ of 2.5 to 10.0 g/10 min index;
- a density of 910 to 935 kg/m³, and
- a dynamic viscosity $\eta_{0.0}$ at a shear rate of 0.05 rad/s and a dynamic viscosity $\eta_{300}$ at a shear rate of 300 rad/s which satisfy the following relationship:

$$\eta_{300} \leq 108 \text{ Pa*s} + 0.0253 * \eta_{0.05}, \text{ and}$$

40 to 95 wt % of the multimodal linear low density polyethylene comprising:
- a) a low molecular weight fraction having a lower molecular weight and a lower amount of alpha-olefin comonomers than the multimodal linear low density polyethylene, and
- b) a high molecular weight fraction having a higher molecular weight and a higher amount of alpha-olefin comonomers than the multimodal linear low density polyethylene, wherein the multimodal linear low density ethylene polymer has been produced by polymerising ethylene and at least one alpha-olefin comonomer in the presence of a single site polymerisation catalyst; and wherein the blend has a density within the range from 900 kg/m³ to 965 kg/m³, an $MFR_2$ of from 2 to 50 g/10 min, and a value of the dynamic viscosities $\eta_{300}$ and $\eta_{0.5}$ meeting the following condition: $\eta_{300} \leq 0.233 \cdot \eta_{0.5} + 50.$

23. A process for the preparation of the polymer blend according to claim 1, wherein the low-density polyethylene is polymerized in a high pressure process and blended with the multimodal linear low density polyethylene.

24. The process according to claim 23, wherein the polymerization reactor comprises at least two reaction zones and one or more initiators are separately fed to at least two of these reaction zones.

25. The process according to claim 24, wherein 50 to 80 wt % of the initiator(s) are fed into a first reaction zone and 50 to 20 wt % of the initiator(s) are fed into a second reaction zone which is located downstream from the first reaction zone.

26. The process according to claim 24, wherein the one or more initiators are selected from peroxides.

27. Extrusion coating comprising the polymer blend according to claim 1.

* * * * *

UNITED STATES PATENT AND TRADEMARK OFFICE
CERTIFICATE OF CORRECTION

PATENT NO. : 8,278,393 B2  
APPLICATION NO. : 12/083640  
DATED : October 2, 2012  
INVENTOR(S) : Auli Nummila-Pakarinen et al.

Page 1 of 1

It is certified that error appears in the above-identified patent and that said Letters Patent is hereby corrected as shown below:

In the Claims

Col. 13, Line 45, Claim 2, the density units "kg/M$^3$" should read -- kg/m$^3$ --; line 46, "a, phase" should read -- a phase --; line 49, that portion of the formula reading "tan $\delta_{0...5}$" should read -- tan $\delta_{0.5}$ --.

Col. 13, Line 65, Claim 3, that portion of the formula reading "Pa*s 0.0253" should read -- Pa*s + 0.0253 --; line 66, that portion of the formula reading "tan $\delta_{0...5}$" should read -- tan $\delta_{0.5}$ --.

Col. 14, Line 16, Claim 4, "MFR$_2$ is within" should read -- MFR$_2$ within --.

Col. 14, Line 28, Claim 5, "rad/s is within" should read -- rad/s within --.

Col. 14, Line 37, Claim 10, "M$_n$" should read -- M$_w$ --.

Col. 15, Line 5, Claim 21, "inciting" should read -- melting --.

Col. 15, Line 10, Claim 22, "low-densitypolyethylene" should read -- low-density polyethylene --; line 13, "dynamic viscosity $\eta_{0.0}$" should read -- dynamic viscosity $\eta_{0.05}$ --.

Signed and Sealed this  
First Day of July, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,278,393 B2  Page 1 of 1
APPLICATION NO. : 12/083640
DATED : October 2, 2012
INVENTOR(S) : Auli Nummila-Pakarinen et al.

It is certified that error appears in the above-identified patent and that said Letters Patent is hereby corrected as shown below:

In the Claims

Col. 13, Line 45, Claim 2, the density units "kg/M$^3$" should read -- kg/m$^3$ --; line 46, "a, phase" should read -- a phase --; line 49, that portion of the formula reading "tan $\delta_{0...5}$" should read -- tan $\delta_{0.5}$ --.

Col. 13, Line 65, Claim 3, that portion of the formula reading "Pa*s 0.0253" should read -- Pa*s + 0.0253 --; line 66, that portion of the formula reading "tan $\delta_{0...5}$" should read -- tan $\delta_{0.5}$ --.

Col. 14, Line 16, Claim 4, "MFR$_2$ is within" should read -- MFR$_2$ within --.

Col. 14, Line 21, Claim 5, "rad/s is within" should read -- rad/s within --.

Col. 14, Line 37, Claim 10, "M$_n$" should read -- M$_w$ --.

Col. 15, Line 5, Claim 21, "inciting" should read -- melting --.

Col. 15, Line 10, Claim 22, "low-densitypolyethylene" should read -- low-density polyethylene --; line 13, "dynamic viscosity $\eta_{0.0}$" should read -- dynamic viscosity $\eta_{0.05}$ --.

This certificate supersedes the Certificate of Correction issued July 1, 2014.

Signed and Sealed this
Twenty-first Day of October, 2014

Michelle K. Lee
*Deputy Director of the United States Patent and Trademark Office*